(12) United States Patent
Fattal et al.

(10) Patent No.: US 11,906,758 B2
(45) Date of Patent: Feb. 20, 2024

(54) MULTIVIEW BACKLIGHT, DISPLAY, AND METHOD EMPLOYING AN OPTICAL DIFFUSER

(71) Applicant: LEIA INC., Menlo Park, CA (US)

(72) Inventors: David A. Fattal, Menlo Park, CA (US); Thomas Hoekman, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 88 days.

(21) Appl. No.: 17/678,992

(22) Filed: Feb. 23, 2022

(65) Prior Publication Data

US 2022/0179232 A1 Jun. 9, 2022

Related U.S. Application Data

(63) Continuation of application No. PCT/US2019/048417, filed on Aug. 27, 2019.

(51) Int. Cl.
*G02B 30/33* (2020.01)
*H04N 13/351* (2018.01)
*G02B 5/02* (2006.01)

(52) U.S. Cl.
CPC .......... *G02B 30/33* (2020.01); *G02B 5/0252* (2013.01); *G02B 5/0278* (2013.01); *H04N 13/351* (2018.05)

(58) Field of Classification Search
CPC ............... G02B 30/33; G02F 1/133603; G02F 1/133606
See application file for complete search history.

(56) References Cited

U.S. PATENT DOCUMENTS 9,128,226 B2 9/2015 Fattal et al.
9,201,270 B2 12/2015 Fattal et al.
(Continued)

FOREIGN PATENT DOCUMENTS

KR 101118744 B1 3/2012
KR 101807692 B1 12/2017
(Continued)

OTHER PUBLICATIONS

International Search Report and Written Opinion (ISRWO) by International Searching Authority (ISA) Korean Intellectual Property Office (KIPO) dated May 27, 2020 (9 pages) for foreign counterpart parent International Application No. PCT/US2019/048417.
(Continued)

*Primary Examiner* — Yuzhen Shen
(74) *Attorney, Agent, or Firm* — J. Michael Johnson (57) ABSTRACT

A multiview backlight and display employ diffusion of directional light beams to provide an image of color regions of a color-tailored multibeam element having a size comparable to a size of the color-tailored multibeam element. The multiview backlight includes an array of color-tailored multibeam elements configured to provide the directional light beams and an optical diffuser configured to spread out directional light beams to provide the color region image. The multiview display includes an array of the color-tailored multibeam elements and the optical diffuser. The multiview display further includes an array of light valves configured to modulate the directional light beams as a multiview image.

18 Claims, 6 Drawing Sheets

(56) References Cited

U.S. PATENT DOCUMENTS

| | | |
|---|---|---|
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 10,345,505 B2 | 7/2019 | Fattal |
| 10,551,546 B2 | 2/2020 | Fattal |
| 10,649,128 B2 | 5/2020 | Fattal et al. |
| 10,798,371 B2 | 10/2020 | Fattal |
| 10,802,212 B2 | 10/2020 | Fattal |
| 10,802,443 B2 | 10/2020 | Fattal |
| 10,830,939 B2 | 11/2020 | Fattal et al. |
| 10,838,134 B2 | 11/2020 | Fattal et al. |
| 10,852,560 B2 | 12/2020 | Fattal |
| 10,884,175 B2 | 1/2021 | Fattal |
| 10,928,564 B2 | 2/2021 | Fattal |
| 10,928,677 B2 | 2/2021 | Aieta et al. |
| 10,989,962 B2 | 4/2021 | Ma et al. |
| 11,004,407 B2 | 5/2021 | Fattal et al. |
| 11,016,235 B2 | 5/2021 | Fattal et al. |
| 11,041,988 B2 | 6/2021 | Fattal et al. |
| 11,143,810 B2 | 10/2021 | Fattal et al. |
| 11,143,811 B2 | 10/2021 | Fattal et al. |
| 11,204,457 B2 | 12/2021 | Fattal et al. |
| 2002/0159002 A1 | 10/2002 | Chang |
| 2008/0094528 A1 | 4/2008 | Robinson et al. |
| 2009/0185107 A1 | 7/2009 | Panagotacos et al. |
| 2009/0322986 A1 | 12/2009 | Wei et al. |
| 2012/0200807 A1 | 8/2012 | Wei et al. |
| 2012/0307357 A1 | 12/2012 | Choi et al. |
| 2013/0063496 A1* | 3/2013 | Basler ................. G09G 3/3413 345/102 |
| 2013/0169518 A1 | 7/2013 | Wu et al. |
| 2015/0015456 A1 | 1/2015 | Uchida et al. |
| 2016/0291339 A1 | 10/2016 | Minami |
| 2017/0329149 A1* | 11/2017 | Fattal .................... G02B 30/27 |
| 2017/0363794 A1 | 12/2017 | Wan et al. |
| 2020/0025993 A1 | 1/2020 | Fattal et al. |
| 2020/0150489 A1 | 5/2020 | Ma et al. |
| 2020/0301165 A1 | 9/2020 | Fattal |
| 2021/0223568 A1* | 7/2021 | Makinen ................ H04N 13/31 |
| 2021/0311244 A1 | 10/2021 | Fattal et al. |

FOREIGN PATENT DOCUMENTS

| | | | |
|---|---|---|---|
| TW | 201213983 A | 4/2012 | |
| WO | 2012038856 A1 | 3/2012 | |
| WO | WO-2018140063 A1 * | 8/2018 | ......... G02B 26/0808 |
| WO | 2018200417 A1 | 11/2018 | |
| WO | 2019090139 A1 | 5/2019 | |
| WO | WO-2019094616 A1 * | 5/2019 | ......... G06F 3/04847 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

* cited by examiner

FIG. 8

MULTIVIEW BACKLIGHT, DISPLAY, AND METHOD EMPLOYING AN OPTICAL DIFFUSER

CROSS-REFERENCE TO RELATED APPLICATIONS

This application is a continuation application of and claims priority to International Patent Application No. PCT/US2019/048417, filed Aug. 27, 2019, the entire contents of which are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting employing color-tailored multibeam elements and an optical diffuser with application to providing a color multiview image. In particular, color-tailored multibeam elements having a plurality of color regions are configured to provide directional light beams having different colors corresponding to the colors of different color regions of the color region plurality. Further, the optical diffuser is configured to spread out the directional light beams to provide an image of each of the different color regions having an extent that is comparable or equivalent to a size of the color-tailored multibeam element. In various embodiments, a multiview backlight comprising an array of the color-tailored multibeam elements and the optical diffuser may be used in conjunction with an array of light valves as a multiview display to display a color multiview image. In some embodiments, the use of the optical diffuser to spread out the directional light beams from the color-tailored multibeam elements may mitigate or even eliminate color fringing associated with a separation of color sub-pixels within the light valve array relative to a physical size of the color-tailored multibeam elements.

Figure 1A:
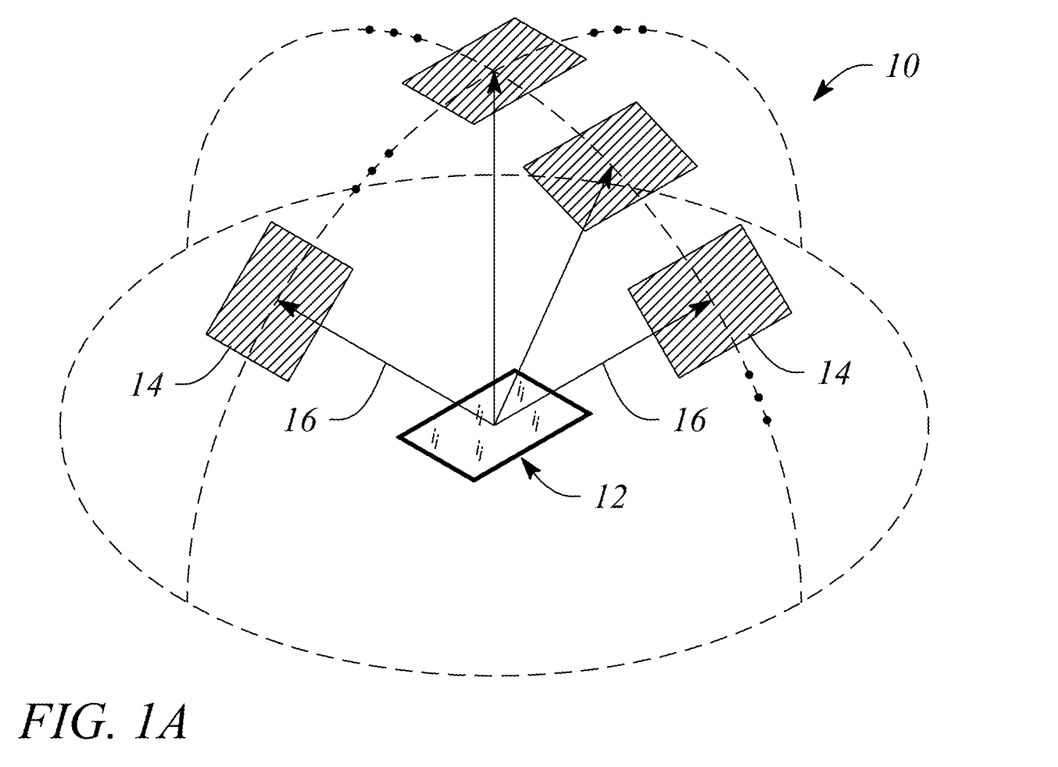
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \varphi\}$, by definition herein. The angular component $\theta$ is referred to herein as the 'elevation component' or 'elevation angle' of the light beam. The angular component $\varphi$ is referred to as the 'azimuth component' or 'azimuth angle' of the light beam. By definition, the elevation angle $\theta$ is an angle in a vertical plane (e.g., perpendicular to a plane of the multiview display screen) while the azimuth angle $\varphi$ is an angle in a horizontal plane (e.g., parallel to the multiview display screen plane).

Figure 1B:
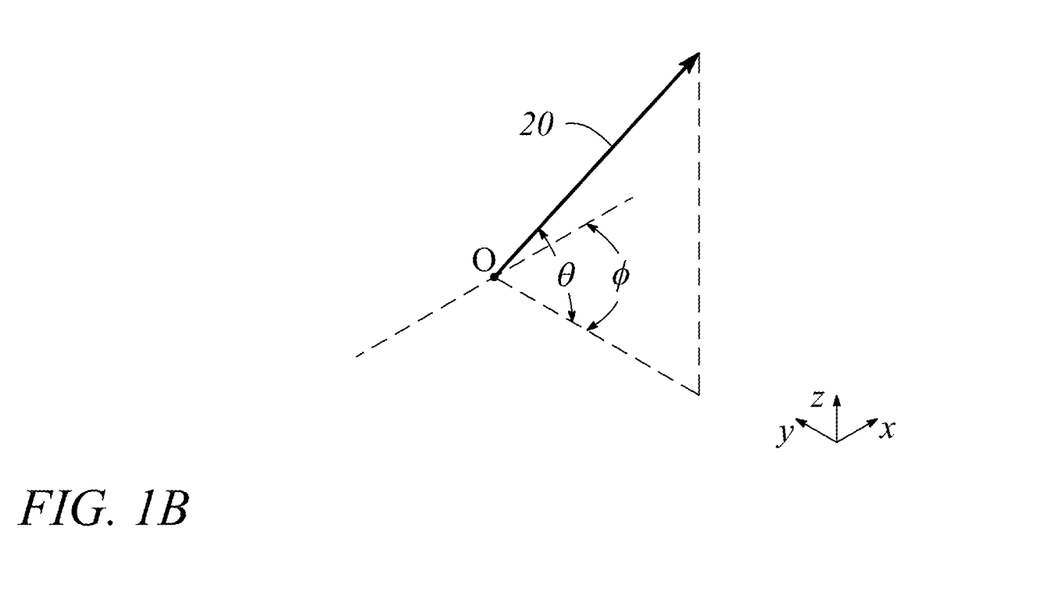
FIG. 1B illustrates a graphical representation of the angular components of a light beam having a particular principal angular direction corresponding to a view direction of a multiview display in an example, according to an embodiment consistent with the principles described herein.

FIG. 1B illustrates a graphical representation of the angular components $\{\theta, \varphi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of pixels representing 'view' pixels in each of a similar plurality of different views of a multiview display. In particular, a multiview pixel may have an individual pixel or set of pixels corresponding to or representing a view pixel in each of the different views of the multiview image. By definition herein therefore, a 'view pixel' is a pixel or set of pixels corresponding to a view in a multiview pixel of a multiview display. In some embodiments, a view pixel may include one or more color sub-pixels. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels a multiview pixel may have equivalent or at least substantially similar locations or coordinates in each of the different views. For example, a first multiview pixel may have individual view pixels located at $\{x1, y1\}$ in each of the different views of a multiview image, while a second multiview pixel may have individual view pixels located at $\{x2, y2\}$ in each of the different views, and so on.

In some embodiments, a number of view pixels in a multiview pixel may be equal to a number of views of the multiview display. For example, the multiview pixel may provide sixty-four (64) view pixels associated with a multiview display having 64 different views. In another example, the multiview display may provide an eight by four array of views (i.e., 32 views) and the multiview pixel may include thirty-two 32 view pixels (i.e., one for each view). Additionally, each different view pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of view pixels (i.e., pixels that make up a selected view) in the multiview display views each view of the multiview display. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

By definition herein, a 'multibeam emitter' or equivalently a 'multibeam element' is a structure or element of a backlight or a display that produces light that includes a plurality of light beams. In some embodiments, the multibeam element may be optically coupled to a light guide of a backlight to provide the light beams by coupling or scattering out a portion of light guided in the light guide. In other embodiments, the multibeam element may generate light emitted as the light beams (i.e., may comprise a light source). Further, the light beams of the plurality of light beams produced by a multibeam element have different principal angular directions from one another, by definition herein. In particular, by definition, a light beam of the plurality has a predetermined principal angular direction that is different from another light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the light beams in combination (i.e., the light beam plurality) may represent the light field. According to various embodiments, the different principal angular directions of the various light beams are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a light beam produced by the multibeam element has a principal angular direction given by angular components $\{\theta, \phi\}$, by definition herein, and as described above with respect to FIG. 1B.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Herein, an 'active optical emitter' is defined as an active source of light (e.g., an optical emitter configured to produce and emit light when activated). As such, an active optical emitter does not receive light from another source of light, by definition. Instead, the active optical emitter directly generates light when activated. The active optical emitter may be activated by applying a power source such as a voltage or a current, by definition herein. For example, the active optical emitter may comprise an optical emitter such as a light emitting diode (LED) that emits light when activated or turned on. Applying a voltage to terminals of the LED, for example, may activate the LED. In particular, herein the light source may be substantially any active source of light or comprise substantially any active optical emitter including, but not limited to, one or more of a light emitting diode (LED), a laser, an organic light emitting diode (OLED), a polymer light emitting diode, a plasma-based optical emitter, and a micro LED (μLED). The light produced by the active optical emitter may have a color (i.e., may include a particular wavelength of light), or may be a plurality or range of wavelengths (e.g., polychromatic light or white light). Different colors of light provided or produced by an active optical emitter may include, but are not limited to, primary colors (e.g., red, green, blue), for example. By definition herein, a 'color emitter' is an active optical emitter that provides light having a color. In some embodiments, the active optical emitter may comprise a plurality of active optical emitters. For example, the active optical emitter may include a set or group of active optical emitters. In some embodiments, at least one of the active optical emitters in the set or group of active optical emitters may generate light having a color, or equivalently a wavelength, that differs from a color or wavelength of light produced by at least one other optical emitter of the plurality.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. In other examples, the diffraction grating may be a mixed-period diffraction grating that includes a plurality of diffraction gratings, each diffraction grating of the plurality having a different periodic arrangement of features. Further, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example. A diffraction grating may be tuned to or have diffractive features that are arranged to provide color-specific diffractive scattering, as defined herein.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' or 'diffractive scattering' in that the diffraction grating may couple or scatter light out of the light guide by or using diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be below a top surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a plurality of diffraction gratings, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n\sin\theta_i - \frac{m\lambda}{d}\right) \quad (1)$$

where $\lambda$ is a wavelength of the light, m is a diffraction order, n is an index of refraction of a light guide, d is a distance or spacing between diffractive features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer (i.e., m=±1, ±2, . . . ). A diffraction angle $\theta_m$ of a light beam produced by the diffraction grating may be given by equation (1). First-order diffraction or more specifically a first-order diffraction angle $\theta_m$ is provided when the diffraction order m is equal to one (i.e., m=1). Given that a diffraction grating has a diffraction angle $\theta_m$ that is a function of wavelength $\lambda$, a diffraction grating or a portion thereof may be rendered 'color-tailored' by selecting a particular grating pitch or distance d between diffractive features that is based on or determined by a particular color of light (i.e., the wavelength 2).

Further, as used herein, the article 'a' is intended to have its ordinary meaning in the patent arts, namely 'one or more'. For example, 'a color region' means one or more color regions and as such, 'the color region' means 'color region(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
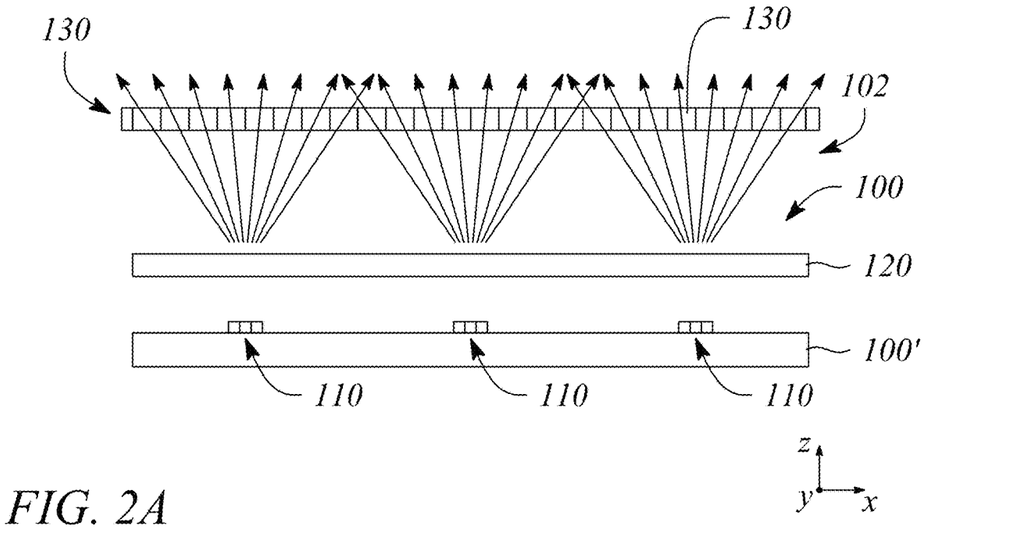
FIG. 2A illustrates a cross-sectional view of a multiview backlight in an example, according an embodiment consistent with the principles described herein.
Figure 2B:
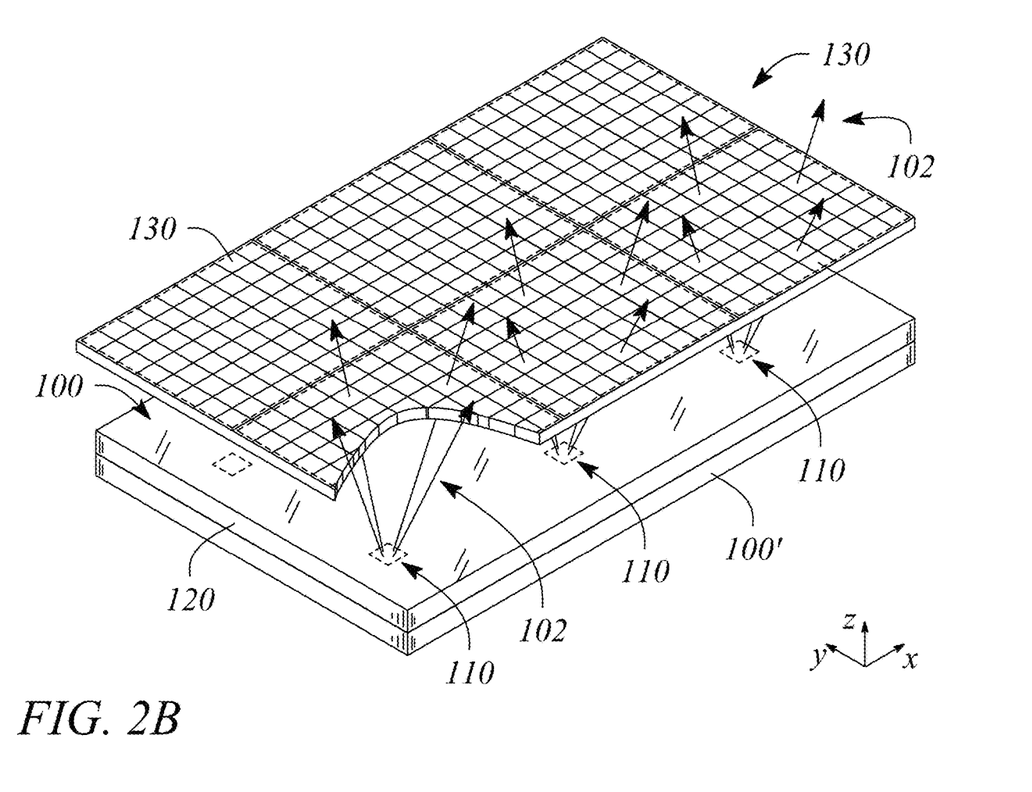
FIG. 2B illustrates a perspective view of a multiview backlight in an example, according an embodiment consistent with the principles described herein.

According to some embodiments of the principles described herein, a multiview backlight 100 is provided. FIG. 2A illustrates a cross-sectional view of a multiview backlight 100 in an example, according to an embodiment consistent with the principles described herein. FIG. 2B illustrates a perspective view of a multiview backlight 100 in an example, according to an embodiment consistent with the principles described herein.

The multiview backlight 100 comprises an array of color-tailored multibeam elements 110. The array of color-tailored multibeam elements 110 may be located at or adjacent to a first surface of the multiview backlight 100. The multiview backlight 100 may be shaped as a 'slab' or a substantially flat block comprising a substrate 100' having two substantially parallel and opposite planar surfaces (i.e., a top and a bottom surface). In some embodiments, such as illustrated in FIGS. 2A and 2B, the array of color-tailored multibeam elements 110 may be located on either a first surface or a second surface of the substrate 100'. In some embodiments, the array of color-tailored multibeam elements 110 may be located inside the substrate 100' or the multiview backlight 100, i.e., between the first surface and the second surface, for example.

As illustrated, the color-tailored multibeam elements 110 of the array of color-tailored multibeam elements are spaced apart from one another. In particular, the color-tailored multibeam elements 110 of the array of color-tailored multibeam elements may be spaced apart from one another across an extent of the multiview backlight 100. In addition, the color-tailored multibeam elements 110 of the array are generally separated from one another by a finite space and represent individual, distinct elements, according to various embodiments. That is, by definition herein, color-tailored multibeam elements 110 of the array are spaced apart from one another according to a finite (i.e., non-zero) inter-emitter distance (e.g., a finite center-to-center distance). Further, the color-tailored multibeam elements 110 of the array generally do not intersect, overlap or otherwise touch one another, according to some embodiments. That is, each color-tailored multibeam element 110 of the array is generally distinct and separated from other ones of the color-tailored multibeam elements 110 of the array.

Figure 3A:
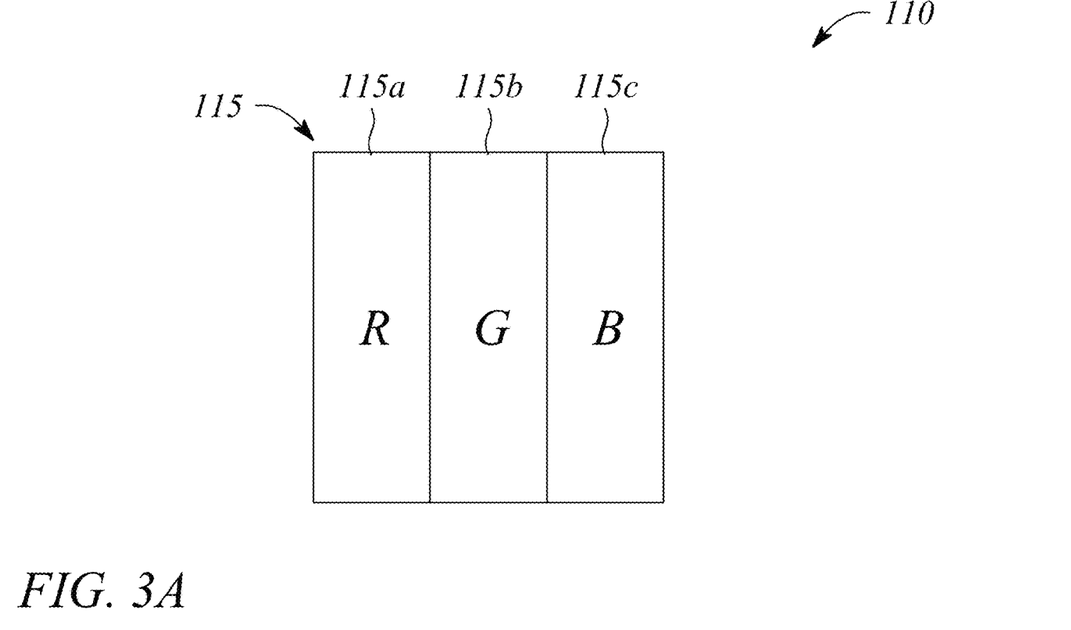
FIG. 3A illustrates a plan view of a color-tailored multibeam element comprising a plurality of color regions arranged adjacent to one another within the color-tailored multibeam element in an example, according an embodiment consistent with the principles described herein.
Figure 3B:
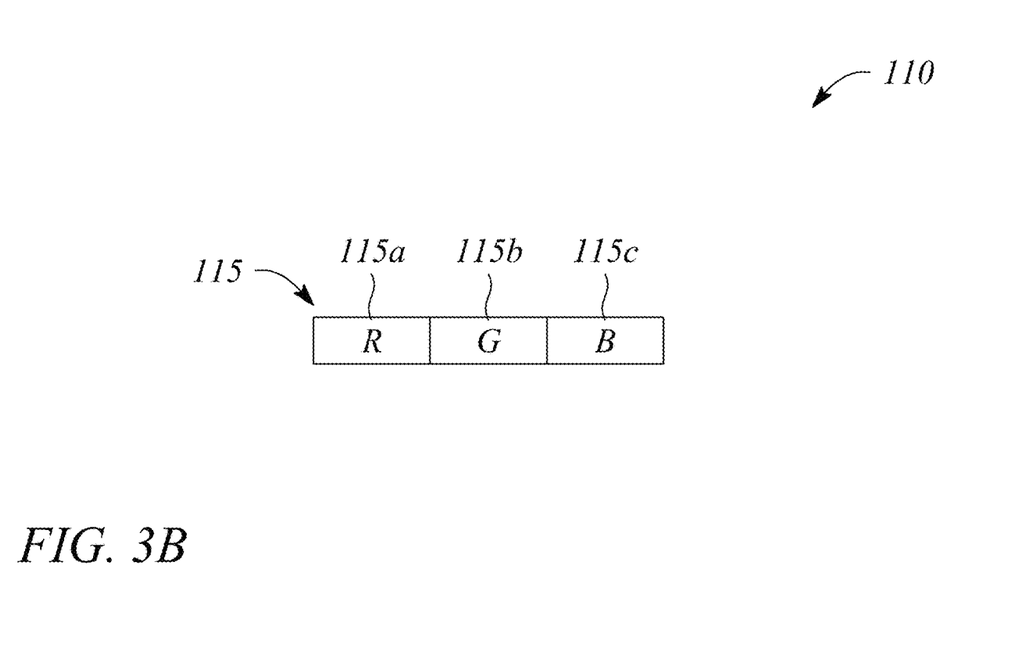
FIG. 3B illustrates a side view of a color-tailored multibeam element comprising a plurality of color regions arranged adjacent to one another within the color-tailored multibeam element in an example, according an embodiment consistent with the principles described herein.

A color-tailored multibeam element 110 of the color-tailored multibeam element array comprises a plurality of color regions arranged adjacent to one another within the color-tailored multibeam element 110. FIG. 3A illustrates a plan view of a color-tailored multibeam element 110 comprising a plurality of color regions 115 arranged adjacent to one another within the color-tailored multibeam element 110 in an example, according to an embodiment consistent with the principles described herein. FIG. 3B illustrates a side view of a color-tailored multibeam element 110 comprising a plurality of color regions 115 arranged adjacent to one another within the color-tailored multibeam element 110 in an example, according to an embodiment consistent with the principles described herein. In the embodiment illustrated, the color-tailored multibeam element 110 illustrated comprises three different color regions 115a, 115b, and 115c. However, the color-tailored multibeam element 110 may comprise any number of color regions. For example, the color-tailored multibeam element may comprise two color regions, or four color regions for example, in some embodiments. The color regions 115 are arranged adjacent to one another within the color-tailored multibeam element 110. In the embodiment illustrated, the color regions of the color-tailored multibeam element are discrete. That is, each color region 115 is distinct and separate from an adjacent color region 115 and no overlap exists between the color regions 115 of the color-tailored multibeam element 110. For example, the color region 115a is separate and distinct from, and does not overlap with, any of the color region 115b or the color region 115c. In other embodiments, adjacent color regions 115 may overlap with each other and a portion of the color-tailored multibeam element 110 may be part of two or more color regions.

Referring again to FIGS. 2A-2B, the color-tailored multibeam element 110 is configured to emit light as a plurality of directional light beams 102 having different colors corresponding to colors of different color regions of the color region plurality. In particular, FIG. 2A illustrates the directional light beams 102 as a plurality of diverging arrows depicted as being directed away from the color-tailored multibeam element 110 of the color-tailored multibeam element array. Thus, in the embodiment illustrated in FIGS. 3A and 3B, the color-tailored multibeam element 110 is configured to emit light as a plurality of directional light beams having different colors corresponding to different colors of the different color regions 115a, 115b, and 115c of the color region plurality. In particular, each color region 115 is configured to emit light having its own color.

As illustrated in FIGS. 2A and 2B, the multiview backlight 100 further comprises an optical diffuser 120. The optical diffuser 120 is configured to spread out directional light beams 102 of the directional light beam plurality from each of the color regions 115 to provide an image of each of the color regions 115 having an extent that is comparable to a size of the color tailored multibeam element 110. The optical diffuser 120 is placed to intercept the directional light beams 102 emitted by the color-tailored multibeam elements 110, and may be located adjacent to a surface of the multiview backlight 100 from which directional light beams 102 are emitted.

Figure 4:
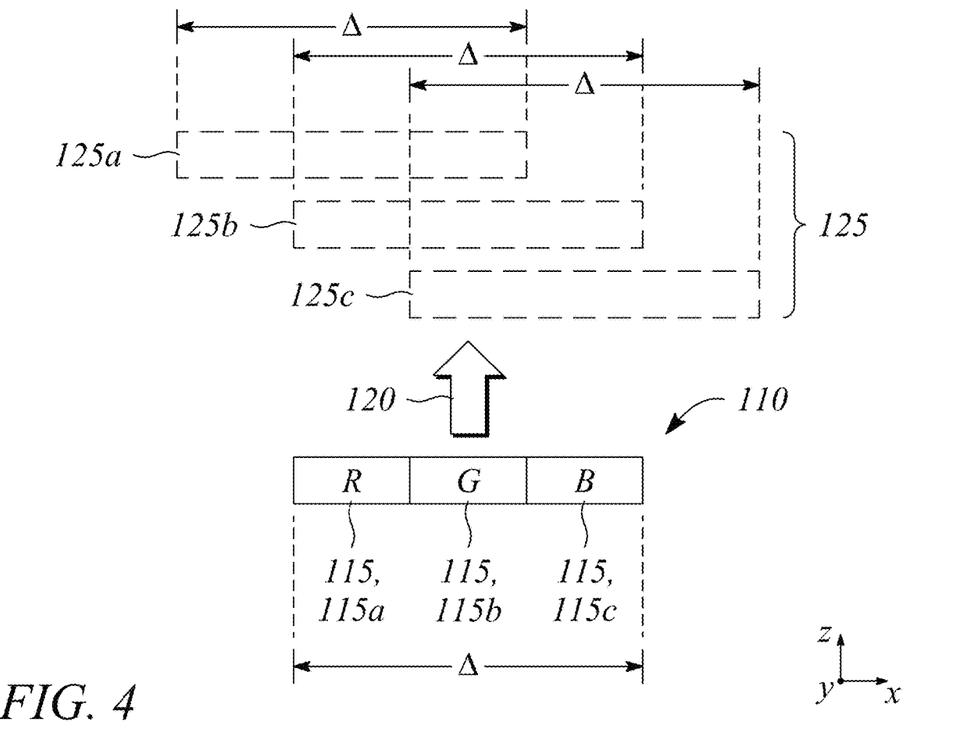
FIG. 4 illustrates a side view of a color-tailored multibeam element in an example, according to an embodiment consistent with the principles described herein.

FIG. 4 illustrates a side view of a color-tailored multibeam element in an example, according to an embodiment consistent with the principles described herein. As illustrated in FIG. 4, a color-tailored multibeam element 110 is shown as having a size Δ. The illustrated color-tailored multibeam element 110 comprises color regions 115. In particular, the color regions 115 illustrated in FIG. 4 include three different color regions 115a, 115b, and 115c representing three different colors of emitted light. The color regions are adjacent to each other on the color-tailored multibeam element 110 and each color region 115 has a size Δ/3, as illustrated. Each color region 115 of the color-tailored multibeam element 110 is configured to emit light as a plurality of directional light beams having different colors corresponding to the different colors of different color regions 115a, 115b, 115c, respectively, of the color region plurality.

The directional light beams emitted by the color regions 115 is intercepted by and pass through the optical diffuser 120 disposed adjacent to the surface of the multiview backlight 100 from which the directional light beams are emitted. The optical diffuser 120 acts to spread out the directional light from each of the color regions 115. The effect of the optical diffuser 120 on the light emitted by the color regions provides an image 125 of each of the color regions 115 having an extent that is equivalent to the size Δ of the color-tailored multibeam element 110. For example, optical diffuser 120 provides an image 125a of the red (R) color region 115a that has the size Δ, as illustrated in FIG. 4. Similarly, an image 125b of the green (G) color region 115b is provided by the optical diffuser 120 and further an image 125c of the blue (B) color region 115c is provided by the optical diffuser 120, as illustrated. As with the image 125a, each of the images 125b, 125c has a size Δ as provided by the optical diffuser 120. When the multiview backlight 100 is employed in a multiview display, the image 125 may have an extent equivalent to the size Δ of the color-tailored multibeam element 110 at a location that corresponds to a light valve array of the multiview display. As a result, from the perspective of the light valve array, each of the images 125 of the color regions 115 illuminating the light valve array has a size Δ of the color-tailored multibeam element 110, i.e., an apparent size of the color region 115 is the size Δ.

A multiview backlight 100 comprising a color-tailored multibeam element 110 having a plurality of color regions 115 configured to emit light having a red (R) color, a green (G) color, and a blue (B) color, respectively, may be employed in a RGB multiview display, for example. In other embodiments, the plurality of color regions 115 may comprise color regions 115 configured to emit light having other colors besides or in addition to red, green, and blue. For example (not illustrated), a color-tailored multibeam element 110 in another embodiment may comprise a plurality of color regions 115 configured to emit light having a red color, a green color, a blue color, and a yellow color, respectively. A multiview backlight 100 comprising such a color-tailored multibeam element 110 may be employed in an RGBY multiview display, for example.

In some embodiments, the optical diffuser 120 is a one-dimensional (1D) diffuser configured to spread out the plurality of directional light beams 102 from the each of the different color regions 115 along a direction corresponding to the adjacent arrangement of the different color regions. Referring again to FIG. 4, the color regions 115 of the color-tailored multibeam element 110 are spatially arranged or aligned in a particular order along the x-direction. In particular, a red (R) color region 115a, is followed by an adjacent green (G) color region 115b, which in turn is followed by a blue (B) color region 115c adjacent to the green (G) color region 115b along the x-direction, as illustrated. The optical diffuser 120 is configured to spread out the plurality of directional light beams emitted by each of color regions 115, 115a, 115b, and 115c along the x-direction. In the embodiment illustrated, the x-direction may correspond to a length of the multiview backlight 100, for example. As such, the optical diffuser 120 is thus configured to spread out the directional light beams 102 along the length of the multiview backlight 100. In other embodiments, the color regions 115 of the color-tailored multibeam element 110 may be aligned along a different direction (e.g., the y-direction corresponding to the width of the multiview backlight 100) and the optical diffuser 120 may be configured to spread out the directional light beams 102 in the y-direction or along the width of the multiview backlight 100, for example.

FIGS. 2A and 2B further illustrate an array of light valves 130. The array of light valves 130 is configured to modulate the directional light beams 102 of the directional light beam plurality. In various embodiments, different types of light valves may be employed as the light valves 130 of the light valve array including, but not limited to, one or more of liquid crystal light valves, electrophoretic light valves, and light valves based on electrowetting. The light valve array may be part of a multiview display that employs the multiview backlight 100, for example, and is illustrated in FIGS. 2A and 2B along with the multiview backlight 100 for the purpose of facilitating discussion herein. As such, principal angular directions of the directional light beams 102 correspond to view directions of the multiview display, as illustrated.

Figure 5:
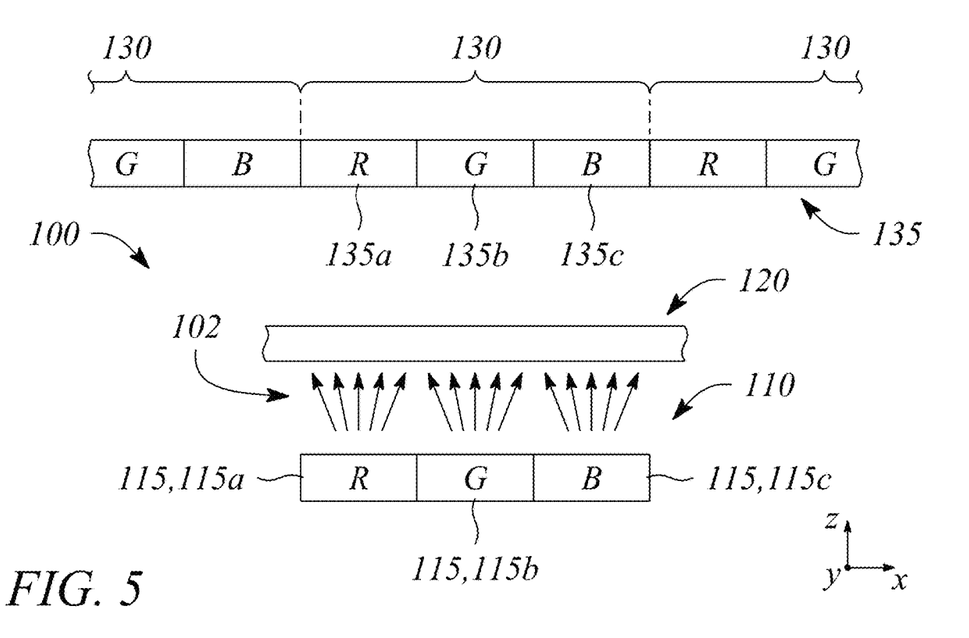
FIG. 5 illustrates a cross-sectional view of a portion of a multiview backlight and a light valve comprising a plurality of color sub-pixels in an example, according an embodiment consistent with the principles described herein.

In these embodiments, a light valve 130 of the array of light valves may comprise a plurality of color sub-pixels 135. The color sub-pixels 135 of the plurality have colors corresponding to the different colors regions 115 within the color region plurality of the color-tailored multibeam element 110. FIG. 5 illustrates a cross-sectional view of a portion of a multiview backlight 100 and a light valve 130 comprising a plurality of color sub-pixels 135 in an example, according an embodiment consistent with the principles described herein. The multiview backlight 100 comprises the color-tailored multibeam element 110 having a plurality of color regions 115, e.g., the red (R) color region 115a, the green (G) color region 115b, and the blue (B) color region 115c, as illustrated. Color sub-pixels 135 of the light valve 130 correspond to the colors of the color regions 115 of the plurality of color regions. In particular, the illustrated the light valve 130 has a red (R) color sub-pixel 135a, a green (G) color sub-pixel 135b, and a blue (B) color sub-pixel 135c, as part of an RGB multiview display.

Further, a spatial arrangement of the different colors regions 115 of the plurality of color regions 115 corresponds to a spatial arrangement of the color sub-pixels 135 of the light valve in FIG. 5. That is, the light valves 130 include color sub-pixels 135 that are arranged in a repeating pattern of red (R) color sub-pixels 135a, green (G) color sub-pixels 135b, and blue (B) color sub-pixels 135c, in the x-direction, by way of example and not limitation, as illustrated. Further, in FIG. 5, the spatial arrangement of the color regions 115 of the color region plurality mirrors the spatial arrangement of the color sub-pixels 135 of the light valve 130, as illustrated. Accordingly, the color regions 115 of the color region plurality are arranged in the same manner as the color sub-pixels 135, namely a red (R) color region 115a followed by a green (G) color region 115b followed by a blue (B) color region 115c, also in the x-direction. In other embodiments where the array of light valves 130 includes a different spatial arrangement of color sub-pixels 135, the spatial arrangement of the plurality of color regions 115 may similarly mirror or be the same as that different spatial arrangement of the color sub-pixels 135.

In some embodiments, a size of the color-tailored multibeam element 110 is comparable to a size of a light valve 130 of the multiview display. Herein, the 'size' may be defined in any of a variety of manners to include, but not be limited to, a length, a width or an area. For example, the size of a light valve 130 may be a length thereof and the comparable size of the color-tailored multibeam element 110 may also be a length of the color-tailored multibeam element 110. In another example, size may refer to an area such that an area of the color-tailored multibeam element 110 may be comparable to an area of the light valve 130. In some embodiments, the size of the color-tailored multibeam element 110 is comparable to the light valve size such that the color-tailored multibeam element size is between about twenty-five percent (25%) and about two hundred percent (200%) of the light valve size. In other embodiments, the comparable size of the color-tailored multibeam element 110 may be between about fifty percent (50%) and about one hundred fifty percent (150%). For example, the color-tailored multibeam element size may be about equal to the light valve size. The comparable size of the color-tailored multibeam element 110 and light valve 130 may mitigate or even prevent Moiré (i.e., the production of a Moiré pattern) at the light valve array, in some embodiments.

Further, in some embodiments, a size of each of the color regions 115 of the color-tailored multibeam element 110 is also comparable to a size of the corresponding color sub-pixel 135 of the light valve 130 of the light valve array. For example, in an RGB multiview display, a portion of which is depicted in FIG. 5, the color-tailored multibeam element 110 comprises three color regions 115, and the light valve 130 comprises three color sub-pixels 135*a*, 135*b*, and 135*c*. Each of the color regions 115 has a size comparable to that of the color sub-pixel 135 of the light valve 130. The comparable size of each of the color regions 115 and the color sub-pixels 135 may also mitigate or even avoid Moiré at the light valve array after diffuser by the optical diffuser 120, in some embodiments.

Figure 6:
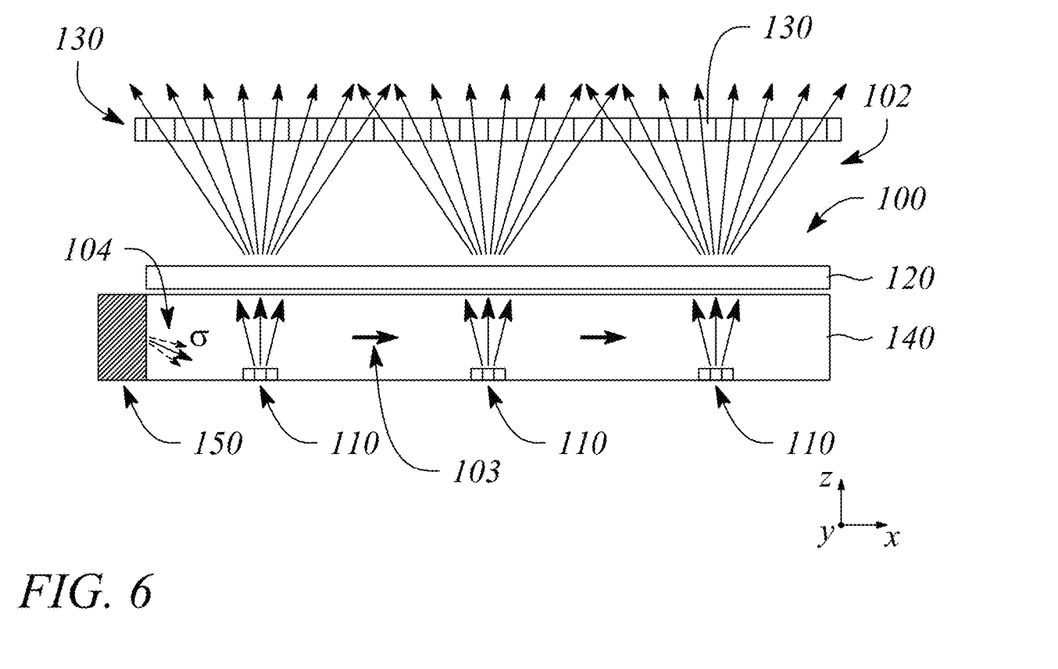
FIG. 6 illustrates a cross-sectional view of a multiview backlight in an example, according to an embodiment consistent with the principles described herein.

In some embodiments, the multiview backlight 100 may further comprise a light guide. For example, substrate 100' may be or comprise the light guide. FIG. 6 illustrates a cross sectional view of a multiview backlight 100 in an example, according to an embodiment consistent with the principles described herein. As illustrated, the multiview backlight 100 comprises the array of color-tailored multibeam elements 110, the optical diffuser 120, and a light guide 140. The light guide 140 is configured to guide light along a length of the light guide as guided light 104 (i.e., a guided light beam 104). For example, the light guide 140 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 140, for example. Also illustrated in FIG. 6 is the array of light valves and the plurality of directional light beams 102.

According to various embodiments, the light guide 140 may be a slab or plate of an optical waveguide (i.e., a plate light guide) comprising an extended, substantially planar sheet of optically transparent, dielectric material. The substantially planar sheet of dielectric material is configured to guide the guided light 104 using total internal reflection. According to various embodiments, the optically transparent material of the light guide 140 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 140 may further include a cladding layer (not illustrated) on at least a portion of a surface (e.g., one or both of the first surface and the second surface) of the light guide 140. The cladding layer may be used to further facilitate total internal reflection, according to some examples.

According to various embodiments, the light guide 140 is configured to guide the guided light 104 according to total internal reflection at a non-zero propagation angle between a first surface (e.g., front or top surface or side) and a second surface (e.g., back or bottom surface or side) of the light guide 140. In particular, the guided light 104 propagates by reflecting or 'bouncing' between the first surface and the second surface of the light guide 140 at the non-zero propagation angle. In some embodiments, a plurality of guided light beams 104 comprising different colors of light may be guided by the light guide 140 at respective ones of different color-specific, non-zero propagation angles. Note that the non-zero propagation angle is not illustrated in FIG. 6 for simplicity of illustration. However, a bold arrow depicting a propagation direction 103 illustrates a general propagation direction of the guided light 104 along the light guide length in FIG. 6. Further, light that is guided as the guided light 104 may be provided by a light source 150, e.g., optically connected to an edge of the light guide 140, as illustrated in FIG. 6.

In some embodiments, color-tailored multibeam elements 110 of the color-tailored multibeam element array are spaced apart from one another along the light guide length. The color-tailored multibeam elements 110 of the array may be located at or adjacent to the first (or 'top') surface of the light guide 140. In other embodiments, the color-tailored multibeam elements 110 of the array may be located on the second (or 'bottom') surface of the light guide 140, for example as illustrated in FIG. 6. In some embodiments, the color-tailored multibeam elements 110 of the array may be located inside the light guide 140 separated from, but between the first and second surfaces.

According to various embodiments, the color-tailored multibeam element 110 of the color-tailored multibeam element array is configured to scatter out light from the light guide 140 as the plurality of directional light beams 102. According to various embodiments, the color-tailored multibeam element 110 may comprise any of a number of different structures configured to scatter out a portion of the guided light 104 as directional light beams 102. For example, the different structures may include, but are not limited to, diffraction gratings, micro-reflective elements, micro-refractive elements, or various combinations thereof. In some embodiments, the color-tailored multibeam element 110 comprising a diffraction grating is configured to diffractively scatter out the guided light portion as the plurality of directional light beams according to or having specific colors. Thus, a color tailored multibeam element 110 may comprise a 'color tailored' diffraction grating, for example. In other embodiments, the color-tailored multibeam element 110 comprising a micro-reflective element is configured to reflectively scatter out the guided light portion as the plurality of directional light beams, or the color-tailored multibeam element 110 comprising a micro-refractive element is configured to scatter out the guided light portion as the plurality of directional light beams by or using refraction (i.e., refractively scatter out the guided light portion). In these embodiments, the reflective scattering and the refractive scattering may be provided in a color-specific or color-tailored manner. As such, the color-tailored multibeam element 110 may comprise a one or both of 'color-tailored' micro-reflective element or a 'color-tailored' micro-refractive element.

In some embodiments, an optimal diffusion $\delta n_x$ (e.g., ray diffusion) provided by the optical diffuser 120 along an x-direction may be given by equation (2), $$\delta n_x = \frac{n \cdot \Delta}{c \cdot t} \qquad (2)$$

where n is the effective refractive index of the light guide 140, $\Delta$ is a size of the color-tailored multibeam element 110, c is the number of color regions 115 within the color-tailored multibeam element 110, and t is a thickness of the light guide 140. Further, the diffusion $\delta n_x$ may be related to a diffusion angle γ in degrees and normal to a surface of the light guide 140 as given by equation (3)

$$\delta n_x = n \cdot \sin(\gamma) \qquad (3)$$

Note that, more generally, the thickness t may be a distance between the color-tailored multibeam element 110 and the optical diffuser 120, e.g., when active optical emitters in the color-tailored multibeam element 110 are employed, as described below.

In some embodiments, the color-tailored multibeam element 110 comprises a plurality of active optical emitters. In particular, each color region 115 of the color region plurality may comprise an active optical emitter. The active optical emitter of the color regions 115 is configured to emit light having a color corresponding to the color of the different color region 115. Thus, a color-tailored multibeam element 110 may comprise three adjacent active optical emitters configured to emit light having a red color, a green color, and a blue color, respectively, for example. The active optical emitter may comprise any number of different optical emitters configured to emit light as a plurality of the directional light beams 102. In some embodiments, the active optical emitter may comprise, but is not limited to, a micro light emitting diode (μLED) or an organic light emitting diode (OLED). Note that when the color-tailored multibeam element 110 comprises active optical emitters, the multiview backlight 100 may comprise the substrate 100' to support the active optical emitters instead of the light guide 140, for example. However, the light guide 140 may also serve as the substrate 100' when active optical emitters are employed, in some embodiments.

Figure 7:
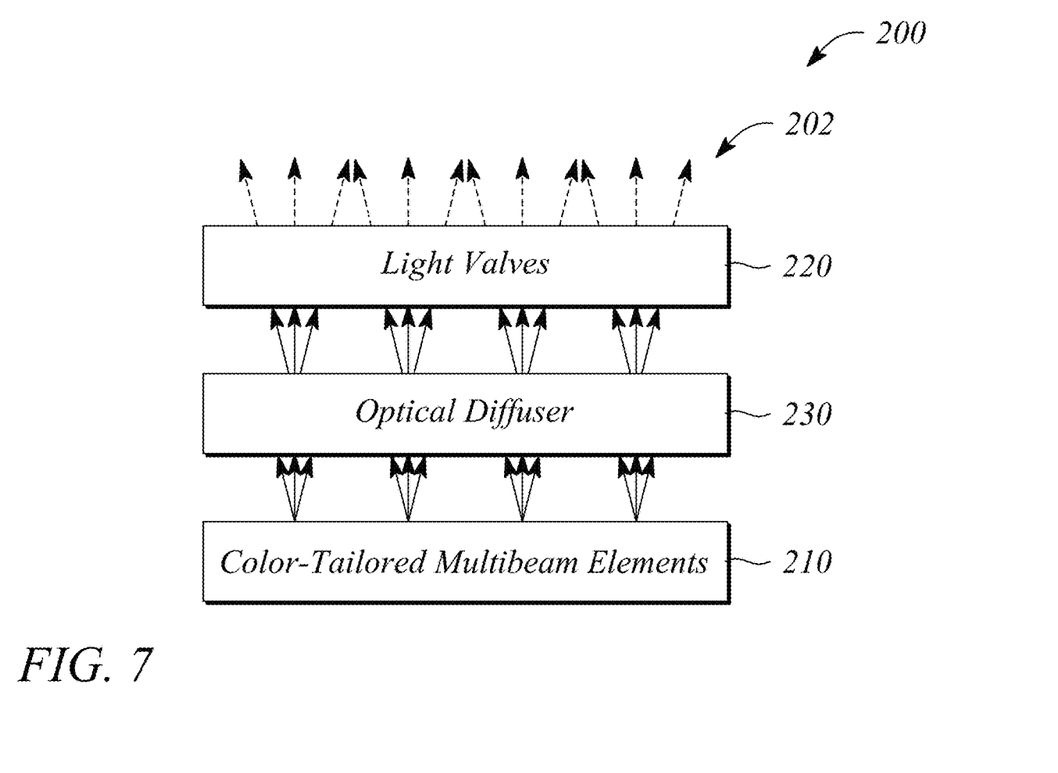
FIG. 7 illustrates a block diagram of a multiview display in an example, according to an embodiment consistent with the principles described herein.

In accordance with some embodiments of the principles described herein, a multiview display 200 is provided. FIG. 7 illustrates a block diagram of a multiview display 200 in an example, according to an embodiment consistent with the principles described herein. The multiview display 200 comprises an array of color-tailored multibeam elements 210 configured to emit light as directional light beams, e.g., illustrated as arrows in FIG. 7. The color-tailored multibeam elements 210 of the color-tailored multibeam element array may be substantially similar to the color-tailored multibeam elements 110 of the multiview backlight 100, described above. The color-tailored multibeam elements 210 may be located on a first or second surface of a multiview backlight substrate (e.g., a light guide) of the multiview display 200. Further, the color-tailored multibeam elements 210 of the color-tailored multibeam element array are spaced apart from one another and may be spread across the surface of the multiview backlight substrate. A color-tailored multibeam element 210 of the color-tailored multibeam element array comprises a plurality of different color regions configured to emit corresponding different colors of light. The color-tailored multibeam element 210 may comprise any number of color regions. For example, the color-tailored multibeam element 210 may comprise two color regions, or four color regions for example, in some embodiments. Further, each of the color regions of the color-tailored multibeam element 210 may be a different color or equivalently emit light of a different color. For example, a color-tailored multibeam element 210 of the color-tailored multibeam element array may comprise red color region, a green color region, and a blue color region. As such, each color region may be configured to emit light corresponding to its color. That is, the red color region is configured to emit light having a red color, the green color region is configured to emit light having a green color, and the blue color region is configured to emit light having a blue color. The color regions may be arranged adjacent to one another within the color-tailored multibeam element 210 in the multiview display 200.

The multiview display 200 illustrated in FIG. 7 further comprises an array of light valves 220 comprising color sub-pixels corresponding to the different colors of light and configured to modulate directional light beams to provide a multiview image. In particular, a color sub-pixel of a light valve 220 of the light valve array corresponds to a color of light emitted by a color region of the color-tailored multibeam element 210 of the color-tailored multibeam element array, according to various embodiments. That is, a light valve 220 of the light valve array may comprise a set of color sub-pixels having colors corresponding to each color regions of the different color region plurality of the color-tailored multibeam element 210. In some embodiments, the light valves 220 of the light valve array may be substantially similar to the light valves 130 of the multiview display associated with the multiview backlight 100, previously described. As such, different types of light valves may be employed as the light valves 220 of the light valve array including, but not limited to, one or more of liquid crystal light valves, electrophoretic light valves, and light valves based on electrowetting.

In some embodiments, a first color region of the different color region plurality is configured to emit light having a red color, a second color region of the different color region plurality is configured to emit light having a green color, and a third color region of the different color region plurality is configured to emit light having a blue color. Correspondingly, a first color sub-pixel of the light valve 220 corresponding to the color-tailored multibeam element 210 has a red color. Similarly, a second color sub-pixel of the light valve 220 corresponding to the color-tailored multibeam element 210 has a green color, while a third color sub-pixel of the light valve 220 corresponding to the color-tailored multibeam element 210 has a blue color. In some embodiments, an arrangement of the color regions of the different color regions plurality within the color-tailored multibeam element corresponds to an arrangement of the color sub-pixels having the corresponding colors.

As illustrated in FIG. 7, the multiview display 200 further comprises an optical diffuser 230 located between the light valves 220 of the light valve array and the color-tailored multibeam element array. The optical diffuser 230 is configured to provide an image at the light valve array of each color region of the different color region plurality, the image having an extent comparable to a size of the color-tailored multibeam element. In some embodiments, the optical diffuser 230 is substantially similar to the optical diffuser 120 of the multiview backlight 100, described above. In particular, the optical diffuser 230 is configured to spread out light emitted by each color region of the different color region plurality to provide the image having an extent comparable to a size of the color-tailored multibeam element. As a result of the spreading of light by the optical diffuser, each of the color regions has an apparent size at the light valve that is comparable to the size of the color-tailored multibeam element 210 of the color-tailored multibeam element array, also as described above. In some embodiments (e.g., as described above), the optical diffuser 230 is a one-dimensional diffuser configured to diffuse light in a direction corresponding to an arrangement direction of the color regions within the different color region plurality to provide the image of each of the color regions.

In some embodiments, a size of the color-tailored multibeam element 210 of the color-tailored multibeam element array is comparable to the light valve size such that the color-tailored multibeam element size is between about twenty-five percent (25%) or about fifty percent (50%) and about two hundred percent (200%) of the light valve size. Further, in some embodiments, a size of each of the different color regions of the color-tailored multibeam element 210 of the color-tailored multibeam element array is also comparable to a size of the corresponding color sub-pixel of the light valve 220 of the light valve array.

In some embodiments (not illustrated), the multiview display 200 further comprises a light guide configured to guide light along a length of the light guide. The light guide may be substantially similar to the light guide 140 of the multiview backlight 100, previously described. In particular, the light guide may be configured to guide the guided light using total internal reflection, according to various embodiments. Further, the guided light may be guided at a non-zero propagation angle by or within the light guide. In some embodiments, the guided light may be collimated or may be a collimated light beam. In particular, the guided light may be collimated according to or having a collimation factor σ, in some embodiments.

According to various embodiments that include the light guide, the color-tailored multibeam elements 210 of the color-tailored multibeam element array may be spaced apart from one another along the light guide length and the color-tailored multibeam elements 210 are configured to scatter out from the light guide a portion of the guided light as the directional light beams. Further, the directional light beams may have principal angular directions corresponding to view directions of the multiview image. According to various embodiments, the color-tailored multibeam element 210 may comprise any of a number of different structures configured to scatter out a portion of the guided light as directional light beams. As described above, the different structures may include, but are not limited to, diffraction gratings, micro-reflective elements, micro-refractive elements, or various combinations thereof. A color-tailored multibeam element 210 of color-tailored multibeam element array has a size between one quarter and two times a size of a light valve 220 of the light valve array, according to various embodiments.

Figure 8:
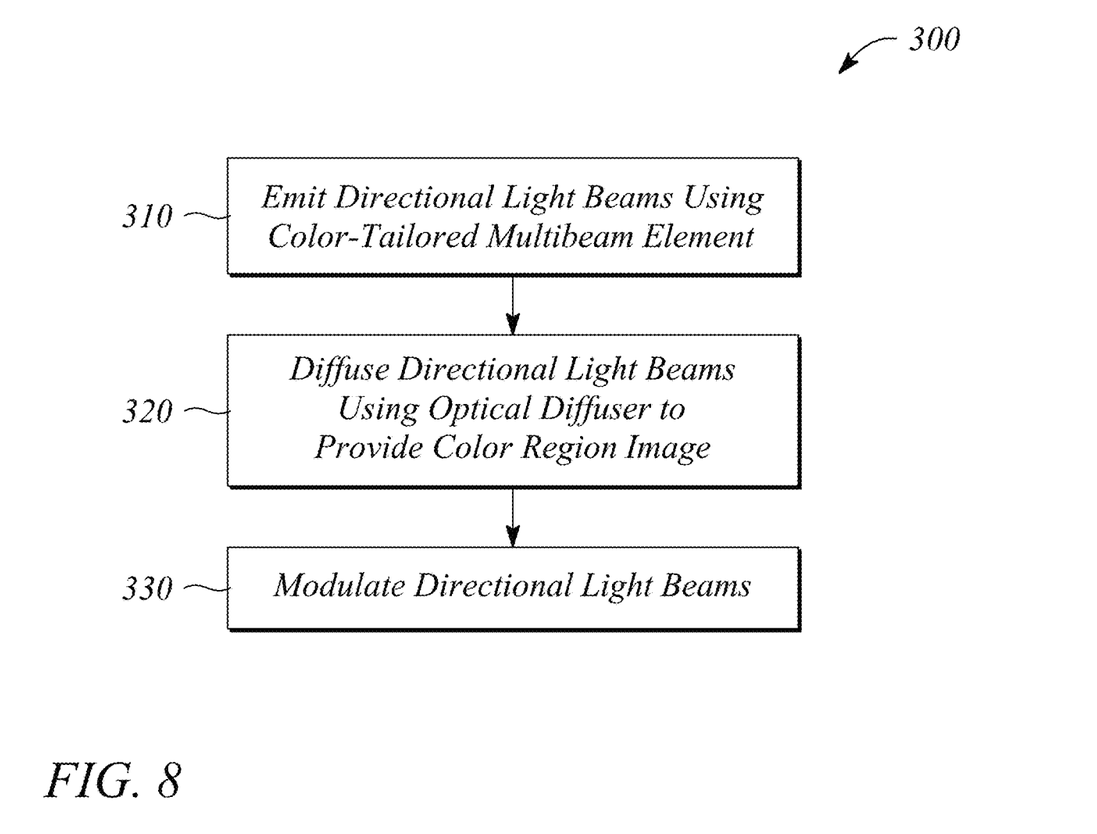
FIG. 8 illustrates a flow chart of a method in an example, according to an embodiment consistent with the principles described herein.

In accordance with some embodiments of the principles described herein, a method of multiview display operation is provided. FIG. 8 illustrates a flow chart of a method 300 in an example, according to an embodiment consistent with the principles described herein. The method 300 comprises emitting 310 a plurality of directional light beams using a color-tailored multibeam element comprising a plurality of color regions, each color region of the color region plurality emitting light having a color corresponding to a color of the color region. In some embodiments, the color-tailored multibeam element may be substantially similar to the color-tailored multibeam element 110 of the above-described multiview backlight 100. For example, the color-tailored multibeam element of the color-tailored multibeam element array may comprise three color regions, e.g., as illustrated in FIGS. 3A and 3B. In some embodiments, the color regions of the color-tailored multibeam element array may be arranged adjacent to one another within the color-tailored multibeam element.

The method 300 further comprises diffusing 320 the plurality of directional light beams using an optical diffuser to provide an image of each color region having an extent comparable to a size of the color-tailored multibeam element. In some embodiments, the optical diffuser may be substantially similar to the optical diffuser 120 described above with respect to the multiview backlight 100. As such, the optical diffuser may be placed to intercept the directional light beams emitted by the color-tailored multibeam elements, and further may be located adjacent to a surface of a multiview backlight of the multiview display from which directional light beams are emitted.

For example, a color-tailored multibeam element may have a size Δ and comprise three color regions, each having a size Δ/3, for example. Diffusing 320 using the optical diffuser acts to spread out the light emitted by each of the three color regions and the image provided at a light valve of the multiview display for each of the color regions may have an extent that is equivalent to the size Δ (i.e., physical size) of the color-tailored multibeam element. In some embodiments, the image having a size Δ provided for color region may overlap with the image having a size Δ provided for another color region of the color-tailored multibeam element.

As illustrated in FIG. 8, the method 300 further comprises modulating 330 the plurality of directional light beams using an array of light valves to provide a multiview image, a light valve of the light valve array having a plurality of color sub-pixels with colors corresponding to the colors of color regions of the color region plurality. In some embodiments, a light valve of the light valve array may be substantially similar to a light valve 130 employed with the multiview backlight 100, described above. In various embodiments, the color sub-pixels of the light valve or equivalently of the array of light valves have colors corresponding to the different color regions within the color region plurality of the color-tailored multibeam element. That is, each color sub-pixel of the light valve corresponds to a different color region of the color-tailored multibeam element.

In some embodiments, a spatial arrangement of color regions of the color region plurality within the color-tailored multibeam element corresponds to a spatial arrangement of the color sub-pixels of the light valve of the light valve array. For example, color sub-pixels of the light valves may be arranged in a repeating pattern of red color sub-pixels, green color sub-pixels, and blue color sub-pixels. The spatial arrangement of the different color regions of the plurality of color regions may mirror the spatial arrangement of the color sub-pixels of the light valve. Accordingly, the different color regions of the plurality may be arranged in the same manner as the color sub-pixels, namely a red color region followed by a green color region followed by a blue color region, in some embodiments. Further, a size of the color-tailored multibeam element may be comparable to a size of the light valve.

In some embodiments (not illustrated), emitting 310 the directional light beams comprises guiding light in a light guide as guided light. The light guide may be substantially similar to the light guide 140 of the multiview backlight 100, and light may be guided at a non-zero propagation angle between opposite internal surfaces of the light guide, in some embodiments. Emitting 310 the directional light beams may further comprise scattering out a portion of the guided light using the color-tailored multibeam element to provide the provide the directional light beams, in these embodiments. In other embodiments, the color-tailored multibeam element may comprise an active optical emitter, as described above with respect to the multiview backlight 100, for example.

Thus, there have been described examples and embodiments of a multiview backlight and a multiview display comprising an array of color-tailored multibeam elements and an optical diffuser configured to spread out directional light beams from each of the different color regions to provide an image of each of the different color regions having an extent that is comparable to a size of the color-tailored multibeam element. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview backlight comprising:
   an array of color-tailored multibeam elements spaced apart from one another across the multiview backlight, a color-tailored multibeam element of the color-tailored multibeam element array comprising a plurality of color regions arranged adjacent to one another within the color-tailored multibeam element and being configured to emit light as a plurality of directional light beams having different colors corresponding to colors of different color regions of the color region plurality;
   a light guide configured to guide light along a length of the light guide, color-tailored multibeam elements of the color-tailored multibeam element array being spaced apart from one another along the light guide length and configured to scatter out from the light guide a portion of the guided light as the plurality of directional light beams; and
   an optical diffuser configured to spread out directional light beams of the directional light beam plurality from each of the different color regions to provide an image of each of the different color regions having an extent that is comparable to a size of the color-tailored multibeam element,
   wherein a diffusion angle of the optical diffuser is equal to a first product of a refractive index of light guide and a size of a color-tailored multibeam element of the color-tailored multibeam element array divided by a second product of a number of the different color regions within the color region plurality of the color-tailored multibeam element and a thickness of the light guide.

2. The multiview backlight of claim 1, wherein the plurality of color regions comprises a first color region configured to emit light having a red color, a second color region configured to emit light having a green color, and a third color region configured to emit light having a blue color.

3. The multiview backlight of claim 1, wherein the optical diffuser is a one-dimensional diffuser configured to spread out the plurality of directional light beams from each of the different color regions along a direction corresponding to the adjacent arrangement of the different color regions within the color-tailored multibeam element.

4. The multiview backlight of claim 1, wherein the color-tailored multibeam element comprises one or more of a diffraction grating configured to diffractively scatter out the portion of the guided light as the directional light beams, a micro-reflective structure configured to reflectively scatter out the portion of the guided light as the directional light beams, and a micro-refractive structure configured to refractively scatter out the portion of the guided light as the directional light beams.

5. A multiview display comprising the multiview backlight of claim 1, the multiview display further comprising an array of light valves configured to modulate the directional light beams of the directional light beam plurality, a light valve of the array comprising a plurality of color sub-pixels having colors corresponding to the different colors of the different color regions within color region plurality of the color-tailored multibeam element,
   wherein a spatial arrangement of the different color regions of the plurality of color regions corresponds to a spatial arrangement of the color sub-pixels of the light valve, and wherein principal angular directions of the directional light beams correspond to view directions of the multiview display.

6. The multiview display of claim 5, wherein a size of the color-tailored multibeam element is between one quarter of a size of the light valve and two times the light valve size.

7. The multiview display of claim 5, wherein a size of each of the different color regions is comparable to a size of a corresponding color sub-pixel of the light valve of the light valve array.

8. A multiview display comprising:
   an array of color-tailored multibeam elements configured to emit light as directional light beams, a color-tailored multibeam element of the color-tailored multibeam element array comprising a plurality of different color regions configured to emit corresponding different colors of light;
   an array of light valves comprising color sub-pixels corresponding to the different colors of light and configured to modulate the directional light beams to provide a multiview image; and
   an optical diffuser located between the light valve array and the color-tailored multibeam element array and configured to provide an image of each color region of the different color region plurality at the light valve array, the image having an extent comparable to a size of the color-tailored multibeam element,
   wherein a diffusion angle of the optical diffuser is equal to a first product of a size of the color-tailored multibeam element and a refractive index of a medium between the color-tailored multibeam element and the light valve array divided by a second product of a number of color regions of the different color region plurality within the color-tailored multibeam element and a distance between the color-tailored multibeam element and the light valve array.

9. The multiview display of claim 8, wherein a first color region of the different color region plurality is configured to emit light having a red color, a second color region of the different color region plurality is configured to emit light having a green color, and a third color region of the different color region plurality is configured to emit light having a blue color.

10. The multiview display of claim 8, wherein an arrangement of color regions of the different color region plurality within the color-tailored multibeam element corresponds to an arrangement of the color sub-pixels having the corresponding colors.

11. The multiview display of claim 8, wherein the optical diffuser is a one-dimensional diffuser configured to diffuse light in a direction corresponding to an arrangement direction of the color regions within the different color region plurality to provide the image of each of the color regions.

12. The multiview display of claim 8, wherein a size of the color-tailored multibeam element is between one half quarter of and two times a size of a light valve of the light valve array, and wherein a size of a color region of the different color region plurality is comparable to a size of a color sub-pixel.

13. The multiview display of claim 8, further comprising:
a light guide configured to guide light along a length of the light guide, color-tailored multibeam elements of the color-tailored multibeam element array being spaced apart from one another along the light guide length and the color-tailored multibeam elements being configured to scatter out from the light guide a portion of the guided light as the directional light beams,
wherein a color-tailored multibeam element of color-tailored multibeam element array has a size between one quarter and two times a size of a light valve of the light valve array, and where principal angular directions of the directional light beams correspond to view directions of the multiview image.

14. The multiview display of claim 8, wherein the color-tailored multibeam element comprises a plurality of active optical emitters, each different color region of the color region plurality comprising an active optical emitter configured to emit light having a color corresponding to the color of the different color region.

15. A method of multiview display operation comprising:
emitting a plurality of directional light beams using a color-tailored multibeam element comprising a plurality of color regions, each color region of the color region plurality emitting light having a color corresponding to a color of the color region;
diffusing the plurality of directional light beams using an optical diffuser to provide an image of each color region having an extent comparable to a size of the color-tailored multibeam element; and
modulating the plurality of directional light beams using an array of light valves to provide a multiview image, a light valve of the light valve array having a plurality of color sub-pixels with colors corresponding to the colors of color regions of the color region plurality,
wherein a diffusion angle of the optical diffuser is equal to a first product of a size of the color-tailored multibeam element and a refractive index of a medium between the color-tailored multibeam element and the light valve array divided by a second product of a number of color regions of a plurality of different color regions within the color-tailored multibeam element and a distance between the color-tailored multibeam element and the light valve array.

16. The method of multiview display operation of claim 15, wherein a spatial arrangement of color regions of the color region plurality within the color-tailored multibeam element corresponds to a spatial arrangement of the color sub-pixels of the light valve of the light valve array, and wherein a size of the color-tailored multibeam element is comparable to a size of the light valve.

17. The method of multiview display operation of claim 15, wherein emitting the directional light beams comprises:
guiding light in a light guide as guided light; and
scattering out a portion of the guided light using the color-tailored multibeam element to provide the directional light beams.

18. The method of multiview display operation of claim 15, wherein the color-tailored multibeam element comprises a plurality of active optical emitters, each different color region of the color region plurality comprising an active optical emitter configured to emit light having a color corresponding to the color of the different color region.

* * * * *